(12) United States Patent
Lavi et al.

(10) Patent No.: US 11,066,211 B1
(45) Date of Patent: Jul. 20, 2021

(54) COLLAPSIBLE CAPSULES AND SUPPLEMENTAL DEVICES

(71) Applicant: FITTO LTD, Tel Aviv (IL)

(72) Inventors: Yaniv Lavi, Tel Aviv (IL); Arye Friedrich, Tel Aviv (IL)

(73) Assignee: FITTO LTD, Tel Aviv (IL)

( * ) Notice: Subject to any disclaimer, the term of this patent is extended or adjusted under 35 U.S.C. 154(b) by 0 days.

(21) Appl. No.: 16/992,236

(22) Filed: Aug. 13, 2020

(51) Int. Cl.
*B65D 21/08* (2006.01)
*A47J 31/40* (2006.01)
*B65D 81/32* (2006.01)

(52) U.S. Cl.
CPC .......... *B65D 21/086* (2013.01); *A47J 31/404* (2013.01); *B65D 81/3216* (2013.01); *B65D 2231/005* (2013.01)

(58) Field of Classification Search
CPC ...... A47J 31/005; A47J 31/404; A47J 31/407; B65D 51/2821; B65D 51/2814; B65D 51/2835; B65D 81/3211; B65D 81/3216; B65D 81/3288; B65D 85/804; B65D 85/8043; B65D 21/086; B65D 2231/00; B65D 2231/005; A47G 2019/2277; A45F 2003/205
See application file for complete search history.

(56) References Cited

U.S. PATENT DOCUMENTS

| | | | |
|---|---|---|---|
| 3,380,662 A | 4/1968 | Garavaglia et al. | |
| 4,657,142 A | 4/1987 | Mizoguchi et al. | |
| 7,279,187 B2 | 10/2007 | Daniels et al. | |
| 9,650,174 B2 | 5/2017 | Seelhofer et al. | |
| 9,932,217 B2 | 4/2018 | Perrelli et al. | |
| D852,583 S * | 7/2019 | Tomalia | ........................ D7/523 |
| 10,450,131 B2 * | 10/2019 | Norton | ............... B65D 85/8043 |
| 2014/0117020 A1 | 5/2014 | Seelhofer et al. | |
| 2015/0044340 A1 | 2/2015 | Ruiz Preciado et al. | |
| 2015/0274412 A1 | 10/2015 | Bisio | |
| 2016/0311608 A1 * | 10/2016 | Accursi | ............... A47J 31/0673 |
| 2017/0355496 A1 | 12/2017 | Seelhofer | |
| 2018/0037392 A1 | 2/2018 | Schwalb et al. | |
| 2018/0099850 A1 | 4/2018 | Lyons et al. | |
| 2019/0375574 A1 * | 12/2019 | Anderson | ............ B67D 3/0019 |

FOREIGN PATENT DOCUMENTS

| | | |
|---|---|---|
| EP | 1433711 A1 | 5/2017 |
| WO | WO-2018/025120 A1 | 2/2018 |

OTHER PUBLICATIONS

Search Report of Application No. PCT/IL2020/051359 dated Apr. 26, 2021.

* cited by examiner

*Primary Examiner* — Mollie Impink

(74) *Attorney, Agent, or Firm* — Pearl Cohen Zedek Latzer Baratz LLP

(57) ABSTRACT

A collapsible capsule including a first annular body portion having a first annular body portion proximal end, a first annular body portion distal end and a first annular body portion diameter, the first annular body portion proximal end comprises an opening, a second annular body portion having a second annular body portion proximal end, a second annular body portion distal end and a second annular body portion diameter that is smaller than the first annular body portion diameter, the second annular body portion distal end is a closed end, and an intermediate annular body portion extending from the first annular body portion distal end to the second annular body portion proximal end.

16 Claims, 7 Drawing Sheets

COLLAPSIBLE CAPSULES AND SUPPLEMENTAL DEVICES

FIELD OF THE INVENTION

The present invention relates to the field of capsules and, more particularly, to collapsible capsules and supplemental devices.

BACKGROUND OF THE INVENTION

Some ingredients, such as dietary supplements, sport supplements, etc., may be encapsulated and supplied to customers in dedicated capsules. Some of these capsules need to be collapsed in order to empty the encapsulated ingredients. Such capsules typically collapse in a random manner. For example, closed cavities may be formed within a capsule interior upon collapsing thereof. Such cavities may contain portions of encapsulated ingredients and may prevent removal of these portions from the capsule, especially when the ingredients are being encapsulated as a powder. This may, for example, lead to consumption of incorrect amounts of ingredients.

SUMMARY OF THE INVENTION

Some embodiments of the present invention may provide a collapsible capsule including: a first annular body portion having a first annular body portion proximal end, a first annular body portion distal end and a first annular body portion diameter, wherein the first annular body portion proximal end includes an opening; a second annular body portion having a second annular body portion proximal end, a second annular body portion distal end and a second annular body portion diameter that is smaller than the first annular body portion diameter, wherein the second annular body portion distal end is a closed end; and an intermediate annular body portion extending from the first annular body portion distal end to the second annular body portion proximal end.

In some embodiments, upon application of a certain pressure on at least one of the intermediate annular body portion and the second annular body portion distal end, the first annular body portion distal folds inwardly towards the first annular body portion proximal end so as to yield a predefined folded shape of the capsule.

In some embodiments, a ratio of a thickness of the first annular body portion over the diameter of the first annular body portion ranges between 0.005 and 0.02.

In some embodiments, a thickness of the first annular body portion is larger than a thickness of the intermediate annular body portion.

In some embodiments, a ratio of the thickness of the first annular body portion over the thickness of the intermediate annular body portion ranges between 1.5-2.5.

In some embodiments, the first annular body portion tapers in a direction extending from the first annular body portion proximal end towards the first annular body portion distal end.

In some embodiments, a taper ratio of the first annular body portion ranges between 0.8 and 0.99.

In some embodiments, the intermediate annular body portion tapers in a direction extending from the first annular body portion distal end towards the second annular body portion proximal end.

In some embodiments, a taper ratio of the intermediate annular body portion ranges between 0.70 and 0.9.

In some embodiments, the collapsible capsule may include elongated folding driving sections arranged along a circumference of the first annular body portion.

In some embodiments, the elongated folding driving sections are evenly arranged along a circumference of the first annular body portion.

In some embodiments, the elongated folding driving sections are aligned in a longitudinal direction along the first annular body portion extending between the first annular body portion proximal end towards the first annular body portion distal end.

In some embodiments, the elongated folding driving sections taper in a direction extending from proximal ends towards distal ends thereof.

In some embodiments, the elongated folding driving sections extend beyond the first annular body portion distal end into the intermediate annular body portion.

In some embodiments, the elongated folding driving sections are dents made on an external surface of the first annular body portion.

In some embodiments, the dents protrude inwardly into an interior defined by the first annular body portion of the capsule.

In some embodiments, an edge along which the first annular body portion distal end is connected to the intermediate annular body portion is rounded at a predefined radius to form a first-intermediate portions rounded connection surface.

In some embodiments, the collapsible capsule may include a base surface protruding outwardly from the first annular body portion proximal end and configured to support the collapsible capsule on a dedicated support.

In some embodiments, a ratio of the predefined radius over first annular body portion diameter may range between 0.03 and 0.08.

In some embodiments, the collapsible capsule may include a lid to cover the opening on the first annular body portion proximal end.

Some embodiments of the present invention may include a bottle coupler including: a connector configured to connect the bottle coupler to a bottle opening; and a capsule support configured to support a proximal end of a collapsible capsule.

In some embodiments, the capsule support may include lid cutting means configured to cut a lid covering an opening on the proximal end of the collapsible capsule.

Some embodiments of the present invention may provide a kit including: a bottle coupler including: a connector configured to connect the bottle coupler to a bottle opening; and a capsule support configured to support a proximal end of a collapsible capsule; and a bottle cap configured to cover the bottle opening and including a pressure applicator configured to apply a pressure on at least a portion of the collapsible capsule upon covering of the bottle opening by the bottle cap.

In some embodiments, the capsule support may include lid cutting means configured to cut a lid covering an opening in the proximal end of the collapsible capsule.

In some embodiments, the pressure applicator may include an annular pressure applicator body protruding from a base face of the bottle cap into an interior thereof, the pressure applicator body being shaped and sized to receive at least a portion of the collapsible capsule and to apply a pressure on at least a portion of the collapsible capsule.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
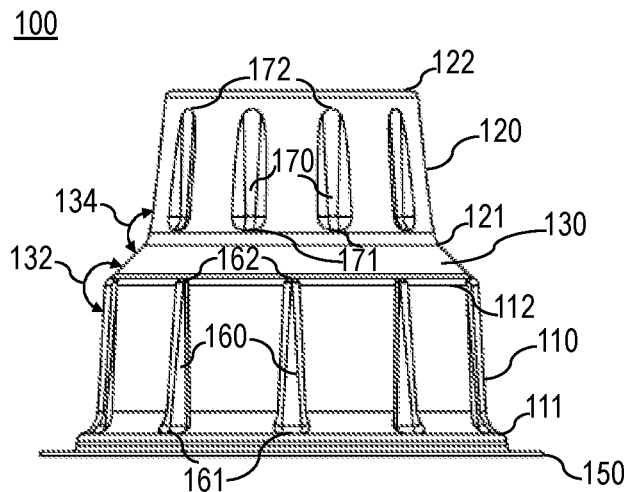
FIGS. 1A, 1B, 1C, 1D, 1E and 1G are schematic illustrations of a collapsible capsule, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Reference is now made to FIGS. 1A, 1B, 1C, 1D, 1E and 1G, which are schematic illustrations of a collapsible capsule 100, according to some embodiments of the invention.

Figure 1B:
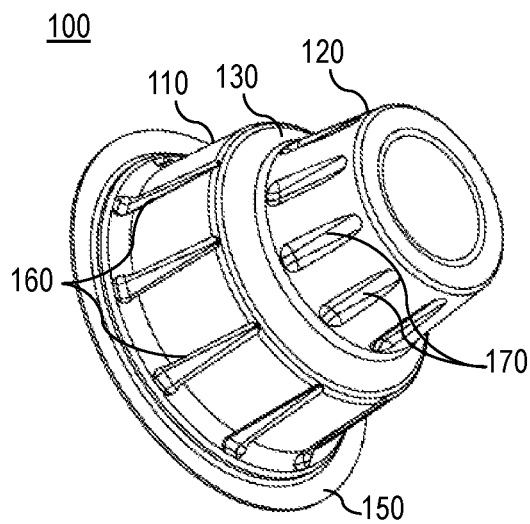
Figure 1C:
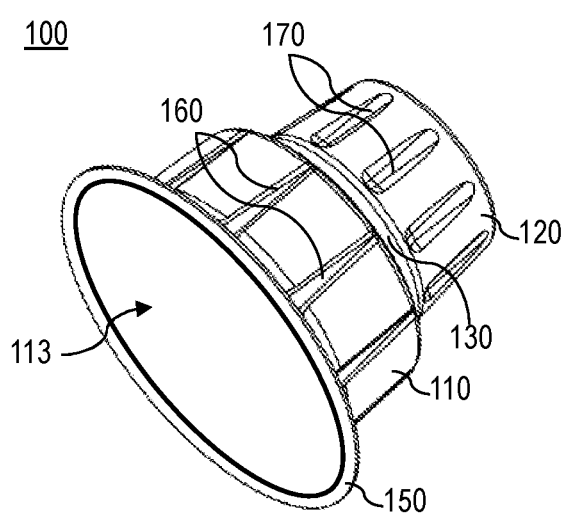
Figure 1D:
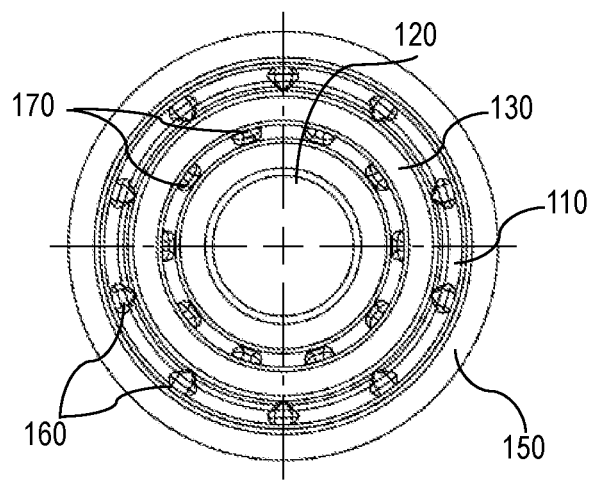
Figure 1E:
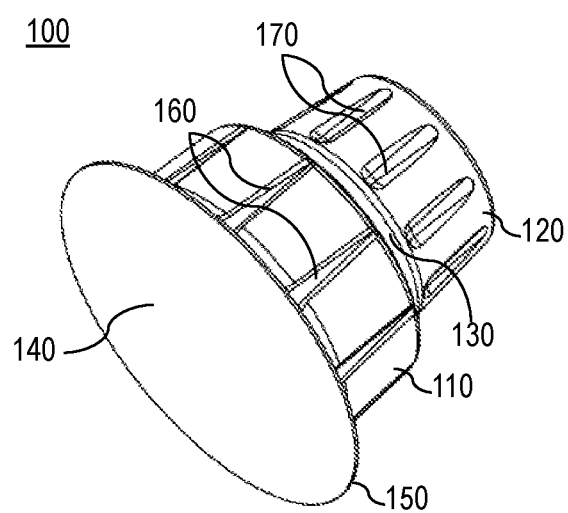
Figure 1F:
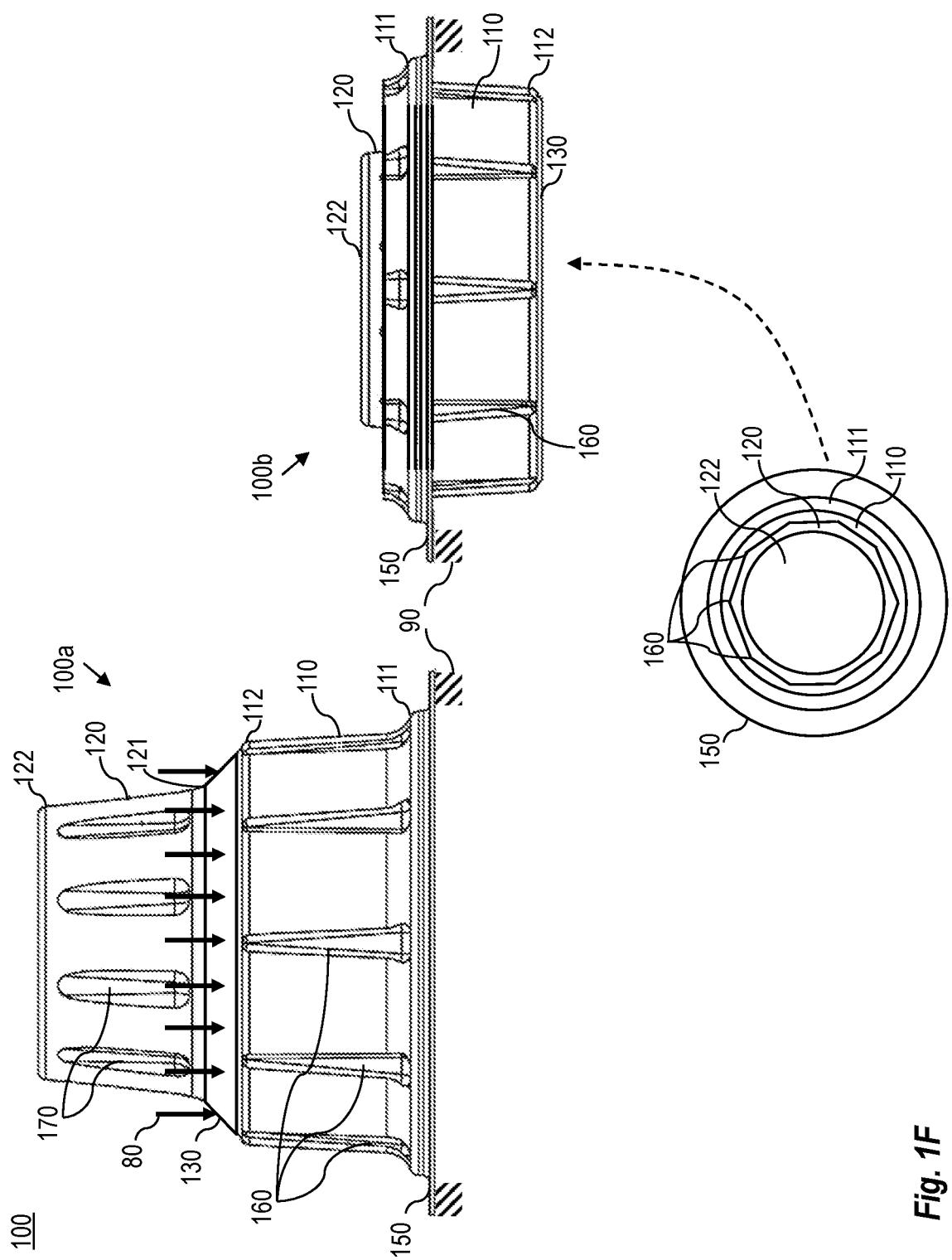
FIG. 1F shows schematic illustrations of a collapsible capsule in its non-collapsed and collapsed states, according to some embodiments of the invention.

Reference is also made to FIG. 1F, which shows schematic illustrations of a collapsible capsule 100 in its non-collapsed and collapsed states, according to some embodiments of the invention.

Figure 1G:
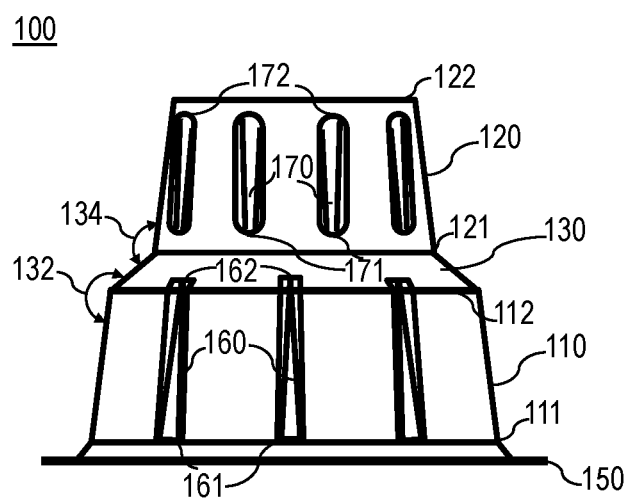

FIGS. 1A, 1F and 1G depict schematic side views of capsule 100. FIGS. 1B, 1C and 1E depict schematic panoramic views of capsule 100. FIG. 1D depicts a schematic top view of capsule 100. Illustrations 100a and 100b in FIG. 1F schematically depict capsule 100 in its non-collapsed state and collapsed sate, respectively.

According to some embodiments, a capsule 100 may include a first annular body portion 110, a second annular body portion 120 and an intermediate annular body portion 130.

First annular body portion 110 may have a first annular body portion proximal end 111 and a first annular body portion distal end 112. Second annular body portion 120 may have a second annular body portion proximal end 121 and a second annular body portion distal end 122. Intermediate annular body portion 130 may extend from first annular body portion distal end 112 to second annular body portion proximal end 121. A diameter of first annular body portion 110 may be larger than a diameter of second annular body portion 120. Second annular body portion distal end 122 may be a closed end. First annular body portion proximal end 111 may include an opening 113 through which ingredients may be inserted into an interior of capsule 100 and removed therefrom (e.g., as shown in FIG. 1C). In some embodiments, capsule 100 may include a lid 140 that may cover opening 113 on first annular body portion proximal end 111 (e.g., as shown in FIG. 1E). Lid 140 may be made of, for example, a foil.

Capsule 100 may encapsulate ingredients, such as dietary supplements, sport supplements, etc., for example in a form of powder. Upon application of a certain pressure on, for example, intermediate annular body portion 130 (e.g., as shown in FIG. 1F) and/or on second annular body portion distal end 122, first annular body portion distal end 112 may fold inwardly towards first annular body portion proximal end 111 (e.g., as shown in FIG. 1F). In this manner, capsule 110 collapses and removes the encapsulated ingredients from the interior of capsule 100. In some embodiments, capsule 100 may include a base surface 150 protruding outwardly from first annular body portion proximal end 111. Base surface 150 may support capsule 100 on a dedicated annular support 90 to enable removal of the encapsulated ingredients from capsule 100 when capsule 100 is being collapsed (e.g., as shown in FIG. 1F).

In various embodiments, capsule 100 may be sized and shaped to collapse in a predefined manner and/or to yield a predefined folded shape of capsule 110. For example, upon application of pressure on intermediate annular body portion 130 and/or on second annular body portion distal end 122, first annular body portion 110 may fold inwardly according to a predefined folding path and/or to yield a predefined folded shape of capsule 110 (e.g., as shown in FIG. 1F). The predefined folding path and/or the predefined folded shape may be repeatable meaning that different capsules like capsule 100 may collapse according to the same (or substantially the same) predefined folding path and/or may yield the same (or substantially the same) predefined folded shape. The predefined folded shape does not include closed cavities and enables removal of all ingredients encapsulated within capsule 100 (e.g., at least 95% of encapsulated ingredients) therefrom.

The diameter of first annular body portion 110 may be larger than the diameter of second annular body portion 120. In some embodiments, a ratio of the diameter of first annular body portion 110 over the diameter of second annular body portion 120 may range between 1 and 2 (e.g., 1.5). For example, for capsule 100 having a first annular body portion proximal end 111 diameter of ~48 mm, the diameter of second annular body portion proximal end 121 may be ~32 mm.

In some embodiments, an angle 132 between an external surface of first annular portion 110 and the external surface of intermediate annular body portion 130 may range between 200° and 270°, and in some embodiments may be smaller than 270°.

In some embodiments, first annular body portion 110 may taper in a direction extending from first annular body portion proximal end 111 towards first annular body portion distal end 112. For example, taper ratio of first annular body portion 110 may range between 0.8 and 0.99, e.g., 0.9. The taper ratio may be a ratio of a diameter of a distal end of an annular body portion over a diameter of a proximal end of the annular body portion.

In some embodiments, intermediate annular body portion 130 may taper in a direction extending from first annular body portion distal end 112 towards second annular body portion proximal end 121. For example, taper ratio of intermediate annular body portion 130 may range between 0.70 and 0.9 (e.g., 0.75).

In some embodiments, an edge along which first annular body portion distal end 112 is connected to intermediate annular body portion 130 may be rounded to form a first-intermediate portions rounded connection surface. For example, the first-intermediate portions connection surface may be rounded at a radius ranging between 0.9 mm and 1.5 mm, e.g., 1 mm. In some embodiments, a ratio of the radius thereof over a diameter of first annular body portion distal end 112 may range between 0.03 and 0.08.

First annular body portion 110 and/or intermediate annular body portion 130 may have predefined thickness values. In some embodiments, a ratio of a thickness of first annular body portion 110 over the diameter of first annular body portion 110 may range between 0.005 and 0.02. For example, for capsule 100 having the first annular body portion proximal end 111 diameter of ~48 mm, the thickness of first annular body portion 110 may range between 1 mm and 1.5 mm.

In some embodiments, the thickness of first annular body portion 110 may be larger than the thickness of intermediate annular body portion 130. In some embodiments, a ratio of the thickness of first annular body portion 110 over the thickness of intermediate annular body portion 130 may range between 1.5-2.5. For example, for capsule 100 having first annular body portion 110 thickness of 1-1.5 mm, the thickness of intermediate annular body portion 130 may range between 0.6 mm and 1 mm.

In some embodiments, first annular body portion 110 may include elongated folding driving sections 160. Elongated folding driving sections 160 may be arranged along a circumference of first annular body portion 110. In some embodiments, elongated folding driving sections 160 may be evenly arranged along the circumference of first annular body portion 110. Elongated folding driving sections 160 may be aligned (or substantially aligned) in a longitudinal direction along first annular body portion 110 extending between first annular body portion proximal end 111 towards first annular body portion distal end 112. In some embodiments, elongated folding driving sections 160 may taper in a direction extending from proximal ends 161 towards distal ends 162 of elongated folding driving sections 160. In some embodiments, distal ends 162 of elongated folding driving sections 160 may extend beyond first annular body portion distal end 112 into intermediate annular body portion 130 (e.g., as schematically shown in FIG. 1G). In some embodiments, elongated folding driving sections 160 may be dents made on the external surface first annular body portion 110. In some embodiments, the dents may protrude inwardly into an interior defined by first annular body portion 110 of capsule 100. The number of elongated folding driving sections 160 and/or the arrangement thereof along the circumference of first annular body portion 110 may, for example, define the folding path along which first annular body portion 110 may fold upon application of pressure 80 on at least one of intermediate annular body portion 130 and second annular body portion distal end 122, and/or may define the folded shape of capsule 100.

In general, the shape and/or one or more dimensions of second annular body portion 120 may be dictated by shape and dimensions of a capsule collapsing device. For example, the capsule collapsing device may be a bottle cap as described below with respect to FIGS. 2A, 2B and 2C.

In some embodiments, second annular body portion 120 and first annular body portion 110 may have the same (or substantially the same) length. In some embodiments, second annular body portion 120 may be longer than first annular body portion 110. In some embodiments, second annular body portion 120 may be shorter than first annular body portion 110. The dimensions (e.g., the diameter and/or the length) of second annular body portion 120 may be, for example, set to provide a desired volume of capsule 100, e.g., without changing the dimensions (e.g., the diameter and/or the length) of first annular body portion 110. In some embodiments, a total length of capsule 100 may be smaller than a diameter of first annular body portion 110. In some embodiments, a ratio of the total length of capsule 100 over the diameter of first annular body portion 110 may range between 0.8 and 0.9 (e.g., 0.85). For example, for capsule 100 having a length of ~42 mm, the diameter of first annular body portion proximal end 111 of first annular body portion 110 may be ~48 mm.

In some embodiments, the thickness of first annular body portion 110 may be larger than the thickness of second annular body portion 120. In some embodiments, a ratio of the thickness of first annular body portion 110 over the thickness of second annular body portion 120 may range between 3 and 7.5. For example, for capsule 100 having first annular body portion 110 thickness of 1-1.5 mm, the thickness of second annular body portion 120 may range between 0.2 mm and 0.3 mm.

In some embodiments, a thickness of second annular body portion distal end 122 may be larger than a thickness of a lateral surface of second annular body portion 120. For example, the thickness of the lateral surface of second annular body portion 120 may range between 0.2 mm and 0.3 mm, and the thickness of second annular body portion distal end 122 thereof may range between 0.5 mm and 1 mm.

In some embodiments, second annular body portion 120 may taper in a direction extending from second annular body portion proximal end 121 towards second annular body portion distal end 122. For example, taper ratio of second annular body portion 120 may range between 0.6 and 0.8 e.g., 0.7.

In some embodiments, an angle 134 between an external surface of second annular body portion 120 and the external surface of intermediate annular body portion 130 may range between 90° and 160°.

In some embodiments, an edge along which second annular body portion proximal end 121 is connected to intermediate annular body portion 130 may be rounded to form a second-intermediate portions rounded connection surface. For example, the second-intermediate portions connection surface may be rounded at a radius ranging between 0.2 mm 0.4 mm (e.g., 0.3 mm).

In some embodiments, second annular body section 120 may include elongated stiffening sections 170. Elongated stiffening sections 170 may be arranged along a circumference of second annular body portion 120. In some embodiments, elongated stiffening sections 170 may be evenly arranged along the circumference of second annular body portion 120. Elongated stiffening sections 170 may be aligned (or substantially aligned) in a longitudinal direction of second annular body portion 120 extending between second annular body portion proximal end 121 towards second annular body portion distal end 122. In some embodiments, elongated stiffening sections 170 may taper in a direction extending from proximal ends 171 towards distal ends 172 of elongated stiffening sections 170. In some embodiments, elongated stiffening sections 170 may be dents made on the external surface second annular body portion 120. In some embodiments, the dents may protrude inwardly into an interior of capsule 100. The number of elongated stiffening sections 170 and/or the arrangement thereof along the circumference of second annular body portion 120 may, for example, increase the strength of second annular body portion 120 as compared to the strength of second annular body portion 120 without elongated stiffening sections 170.

Figure 2A:
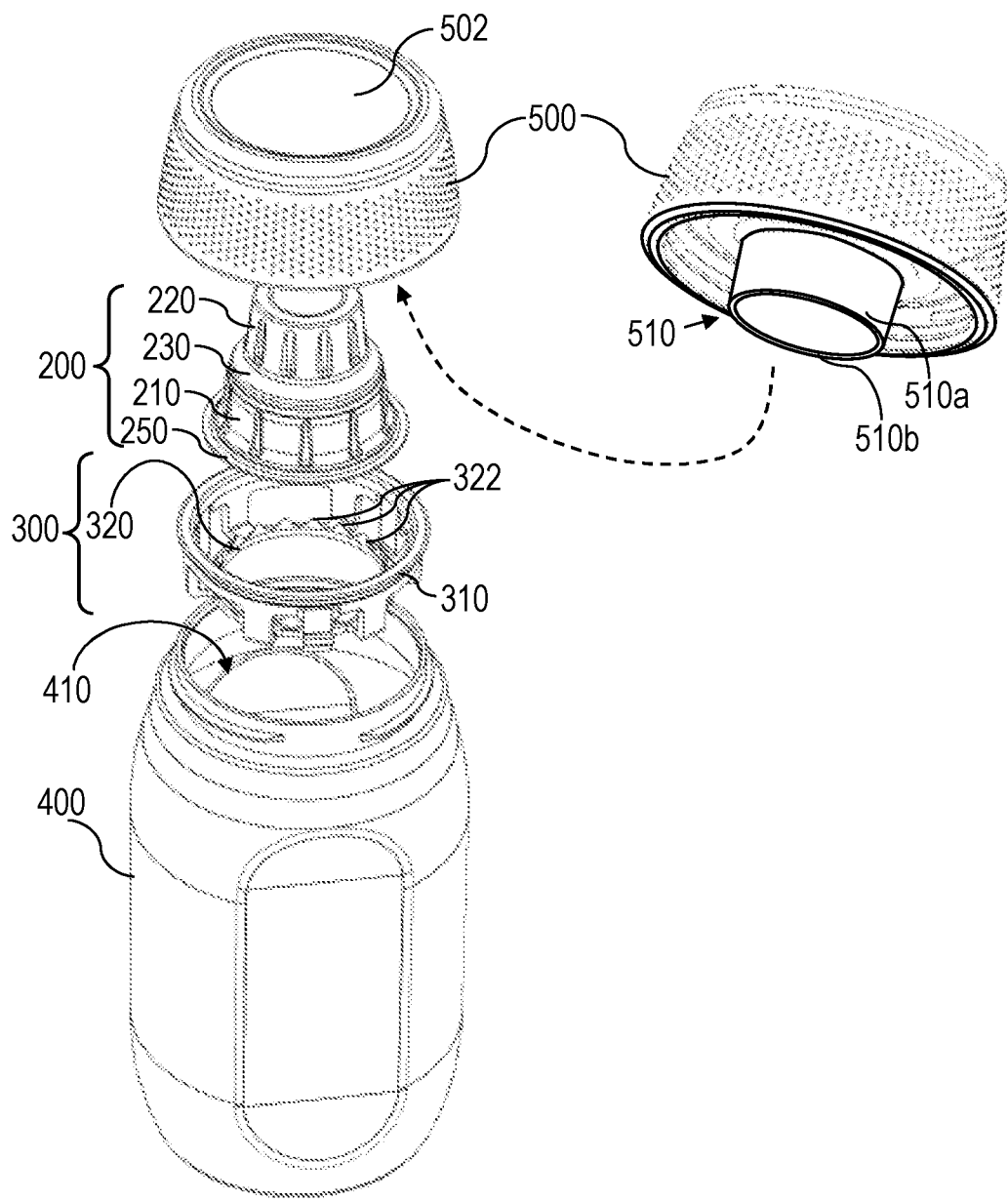
FIGS. 2A and 2B are schematic illustrations of a collapsible capsule, a bottle coupler, a bottle and a bottle cap, according to some embodiments of the invention.
Figure 2B:
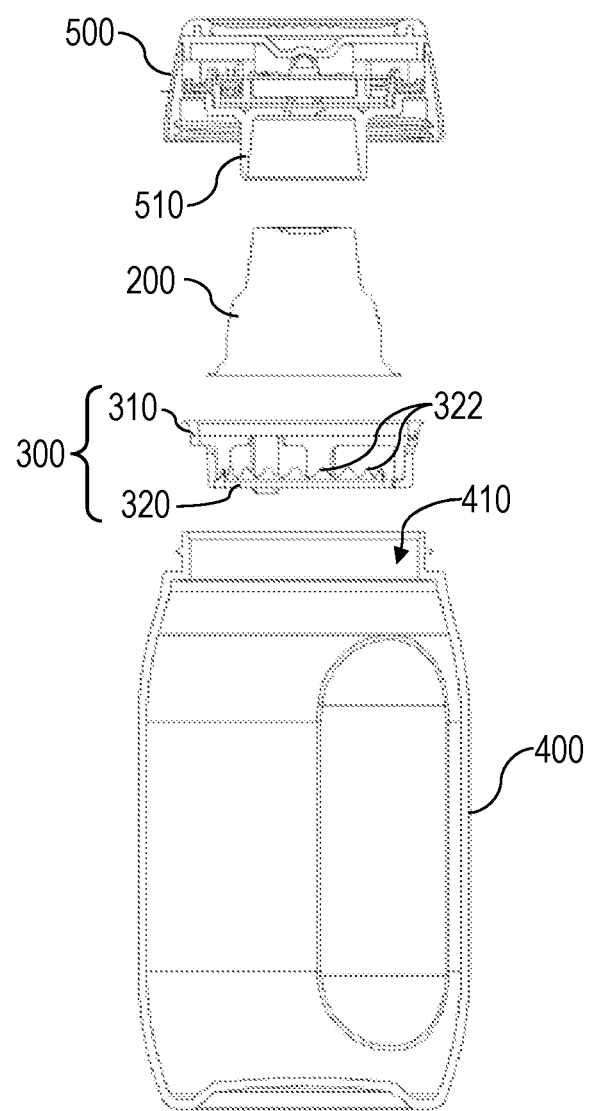

Reference is now made to FIGS. 2A and 2B, which are schematic illustrations of a collapsible capsule 200, a bottle coupler 300, a bottle 400 and a bottle cap 500, according to some embodiments of the invention.

FIG. 2A shows a schematic panoramic view and FIG. 2B shows a schematic cross-sectional view of capsule 200, bottle coupler 300, bottle 400 and bottle cap 500.

Capsule 200, e.g., which may be similar to capsule 100 described above with respect to FIGS. 1A, 1B, 1C, 1D, 1E and 1F, may encapsulate ingredients, such as dietary supplements, sport supplements, etc., for example in a form of powder. Capsule 200 may be removably coupled to a bottle 400 using a bottle coupler 300. Upon application of a pressure by a bottle cap 500 on, for example, an intermediate annular body portion 230 and/or second annular body portion distal end 122 of capsule 200, a first annular body portion 210 of capsule 200 may fold inwardly (e.g., as described above with respect to FIGS. 1A, 1B, 1C, 1D, 1E and 1F) in order to empty the encapsulated ingredients into bottle 400.

In some embodiments, bottle coupler 300 may include a connector 310 configured to connect bottle coupler 300 to a bottle opening 410, and a capsule support 320 connected to connector 310 and configured to support capsule 200. Capsule support 320 may have, for example, annular shape and may be configured to support a base surface 250 of capsule 200 while enabling removal of the encapsulated ingredients when the capsule is being collapsed.

In some embodiments, capsule support 320 may include lid cutting means 322. Lid cutting means 322 may be configured to cut at least a portion of a lid of capsule 200 upon application of a pressure on capsule 200 by, for example, bottle cap 500. For example, lid cutting means 322 may include teeth arranged along a circumference of capsule support 320.

In some embodiments, bottle cap 500 may include a pressure applicator 510. Pressure applicator 510 may be configured to apply a pressure on, for example, intermediate annular body portion 230 of capsule 200. In embodiments shown in FIGS. 2A and 2B, pressure applicator 510 includes an annular pressure applicator body 510a protruding inwardly from a base face 502 of bottle cap 500 into an interior thereof. Annular pressure applicator body 510a may be shaped and sized to receive second annular body portion 220 of capsule 200 and to apply pressure on intermediate annular body portion 230 of capsule 200 with an annular pressure applicator base face 510b.

Some embodiments of the present invention may provide a kit. The kit may include at least two of bottle coupler 300, bottle 400 and bottle cap 500.

Figure 2C:
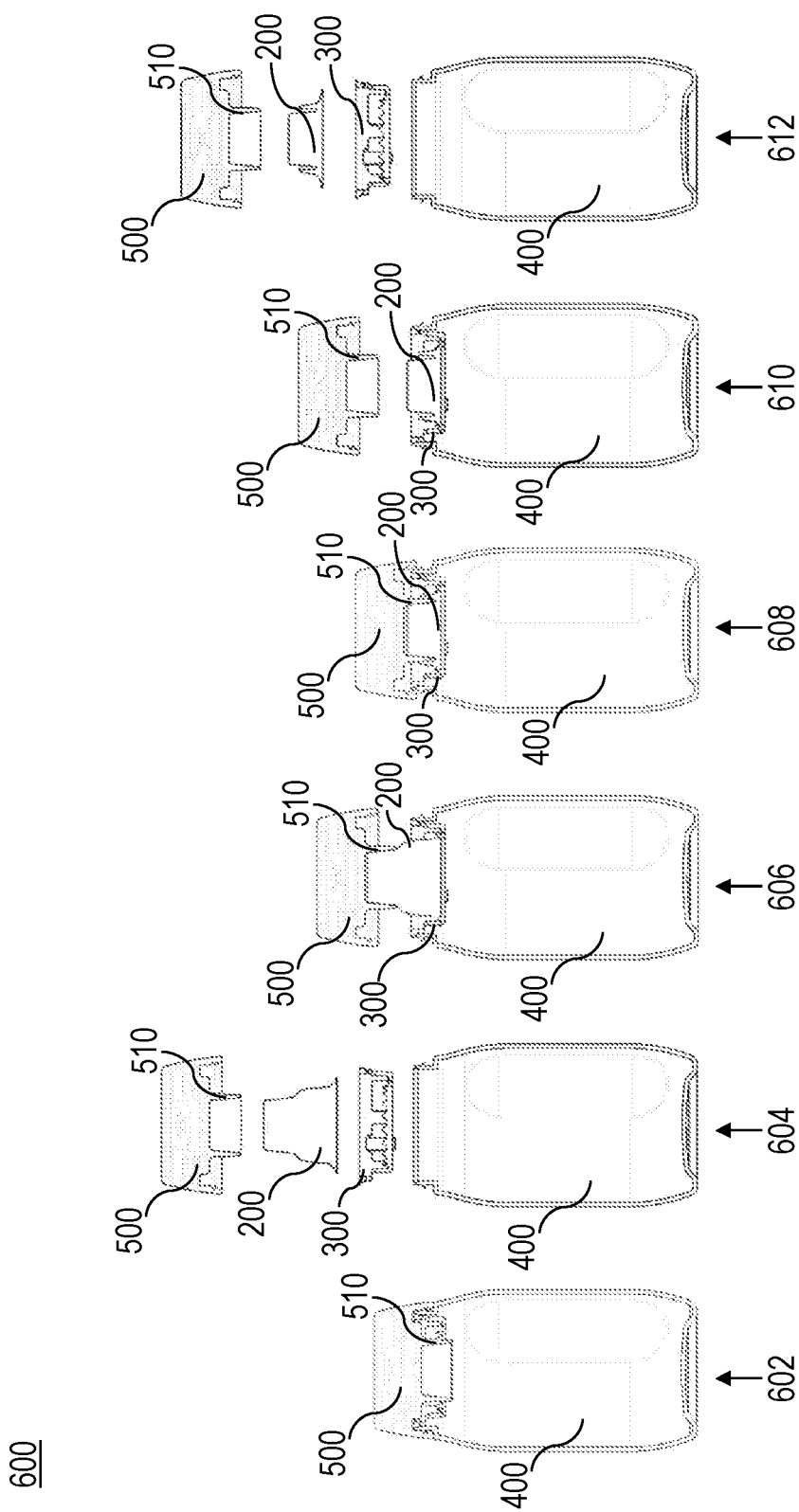
FIG. 2C shows a process of using a collapsible capsule, a bottle coupler, a bottle and a bottle cap, according to some embodiments of the invention.

Reference is now made FIG. 2C, which shows a process 600 of using a collapsible capsule 200, a bottle coupler 300, a bottle 400 and a bottle cap 500, according to some embodiments of the invention.

At 602, bottle 400 covered with bottle cap 500 may be provided. At 604, bottle cap 500 may be removed from bottle 400, and capsule 200 and bottle coupler 300 may be provided. At 606, bottle coupler 300 may be connected to opening 410 of bottle 400, capsule 200 may be placed into bottle coupler 300, and bottle cap 500 may be placed onto capsule 200. At 608, a pressure may be applied on, for example, a base face of bottle cap 500 to thereby collapse capsule 200 and empty the encapsulated ingredients into bottle 400. At 610, bottle cap 500 may be removed from bottle 400. At 612, collapsed capsule 200 may be removed from bottle coupler 300 and bottle coupler 300 may be disconnected from bottle 400.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments.

Other possible variations, modifications, and applications are also within the scope of the invention. Accordingly, the scope of the invention should not be limited by what has thus far been described, but by the appended claims and their legal equivalents.

The invention claimed is:

1. A collapsible capsule comprising:
   a first annular body portion having a first annular body portion proximal end, a first annular body portion distal end and a first annular body portion diameter, wherein the first annular body portion proximal end comprises an opening;
   a second annular body portion having a second annular body portion proximal end, a second annular body portion distal end and a second annular body portion diameter that is smaller than the first annular body portion diameter, wherein the second annular body portion distal end is a closed end;
   an intermediate annular body portion extending from the first annular body portion distal end to the second annular body portion proximal end; and
   two or more elongated folding driving sections arranged along a circumference of the first annular body portion, wherein the elongated folding driving sections extend beyond the first annular body portion distal end;
   wherein a taper ratio of the first annular body portion ranges between 0.80 and 0.99;
   wherein a taper ratio of the intermediate annular body portion ranges between 0.70 and 0.90; and
   wherein, upon application of a certain pressure on at least one of the intermediate annular body portion and the second annular body portion distal end, the second annular body portion moves into a hollow internal space within the first annular body portion, and the first annular body portion distal end folds inwardly towards the hollow internal space of the first annular body such that at least a portion of the first annular body portion inverts inside out.

2. The collapsible capsule of claim 1, wherein a ratio of a thickness of the first annular body portion over the diameter of the first annular body portion ranges between 0.005 and 0.02.

3. The collapsible capsule of claim 1, wherein a thickness of the first annular body portion is larger than a thickness of the intermediate annular body portion.

4. The collapsible capsule of claim 3, wherein a ratio of the thickness of the first annular body portion over the thickness of the intermediate annular body portion ranges between 1.5-2.5.

5. The collapsible capsule of claim 1, wherein the first annular body portion tapers in a direction extending from the first annular body portion proximal end towards the first annular body portion distal end.

6. The collapsible capsule of claim 1, wherein the intermediate annular body portion tapers in a direction extending from the first annular body portion distal end towards the second annular body portion proximal end.

7. The collapsible capsule of claim 1, wherein the elongated folding driving sections are evenly arranged along the circumference of the first annular body portion.

8. The collapsible capsule of claim 1, wherein the elongated folding driving sections are aligned in a longitudinal direction along the first annular body portion extending between the first annular body portion proximal end towards the first annular body portion distal end.

9. The collapsible capsule of claim 1, wherein the elongated folding driving sections taper in a direction extending from proximal ends towards distal ends thereof.

10. The collapsible capsule of claim 1, wherein the elongated folding driving sections extend beyond the first annular body portion distal end into the intermediate annular body portion.

11. The collapsible capsule of claim 1, wherein the elongated folding driving sections are dents made on an external surface of the first annular body portion.

12. The collapsible capsule of claim 11, wherein the dents protrude inwardly into an interior defined by the first annular body portion of the capsule.

13. The collapsible capsule of claim 1, wherein an edge along which the first annular body portion distal end is connected to the intermediate annular body portion is rounded at a predefined radius to form a first-intermediate portions rounded connection surface.

14. The collapsible capsule of claim 13, wherein a ratio of the predefined radius over first annular body portion diameter may range between 0.03 and 0.08.

15. The collapsible capsule of claim 1, comprising a base surface protruding outwardly from the first annular body portion proximal end and configured to support the collapsible capsule on a dedicated support.

16. The collapsible capsule of claim 1, comprising a lid that covers the opening on the first annular body portion proximal end.

* * * * *